July 16, 1968  G. B. LINDERMAN ET AL  3,393,322
PHOTOSENSITIVE DEVICE FOR PROTECTING THE PHOTORESPONSIVE
TRANSDUCER IN A PINHOLE DETECTOR
Filed March 23, 1965  2 Sheets-Sheet 1
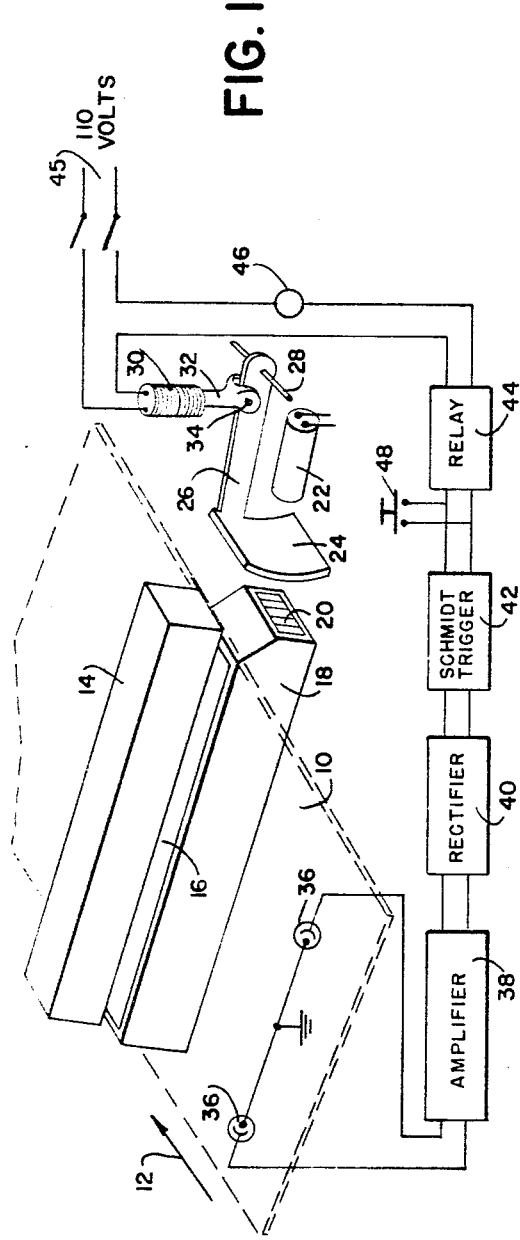
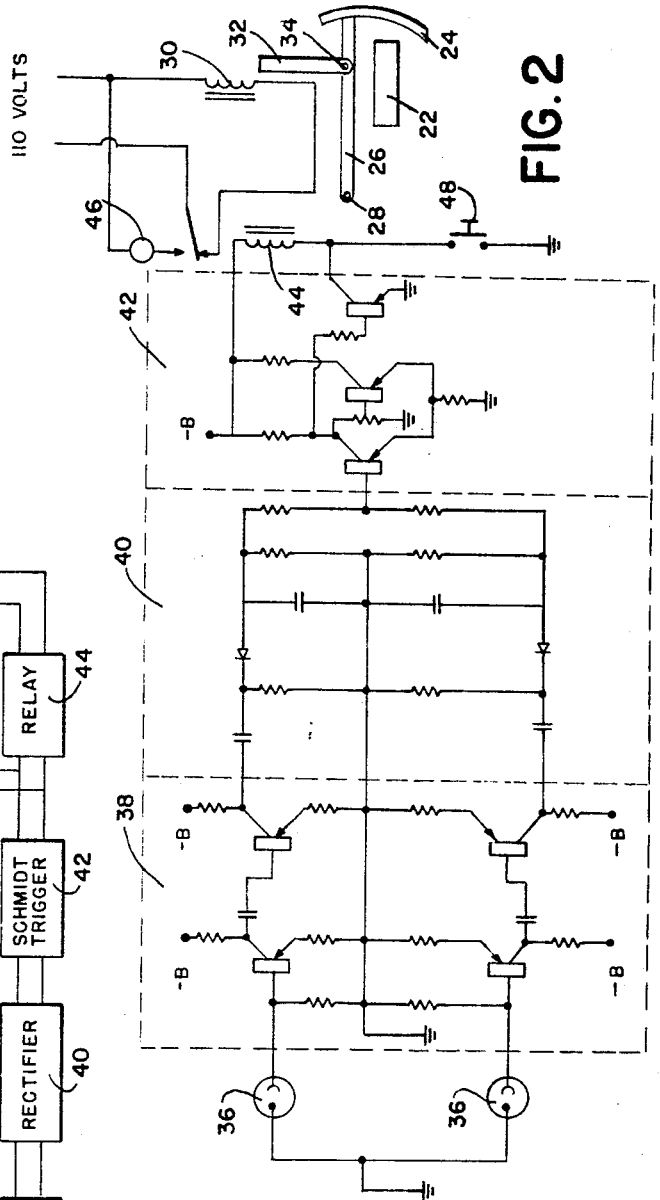
INVENTORS
GARRETT B. LINDERMAN &
HARRY T. GIBSON
BY Raymond W. Cotton
ATTORNEY July 16, 1968  G. B. LINDERMAN ET AL  3,393,322
PHOTOSENSITIVE DEVICE FOR PROTECTING THE PHOTORESPONSIVE
TRANSDUCER IN A PINHOLE DETECTOR
Filed March 23, 1965
2 Sheets-Sheet 2
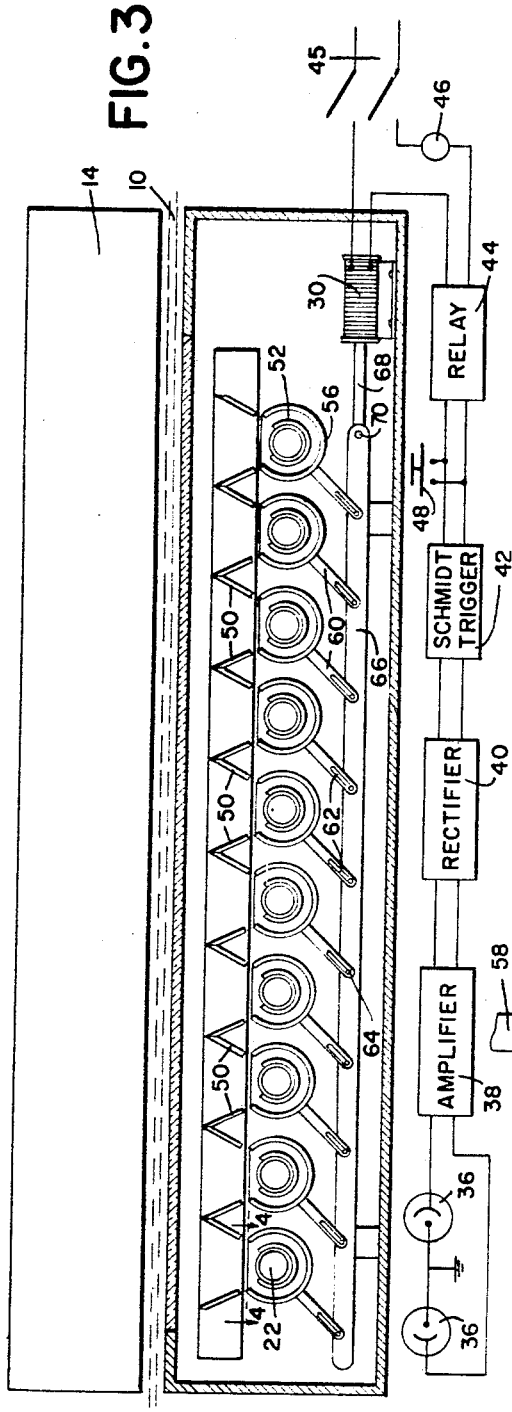
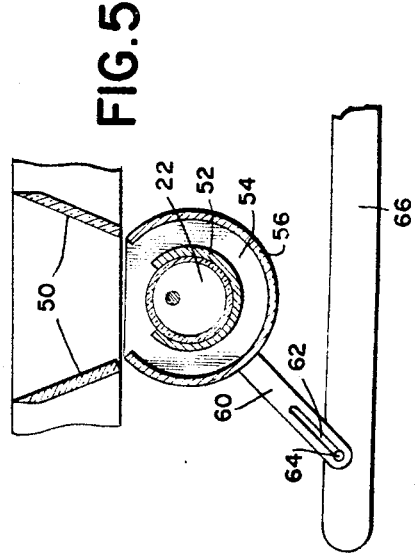
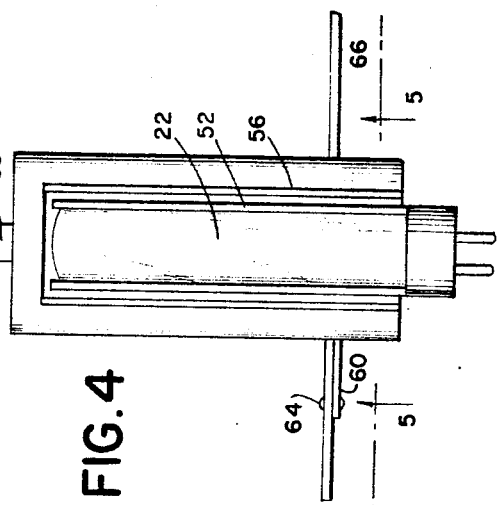
INVENTORS
GARRETT B. LINDERMAN
HARRY T. GIBSON
BY Raymond Wootten
ATTORNEY United States Patent Office 3,393,322
Patented July 16, 1968

3,393,322
PHOTOSENSITIVE DEVICE FOR PROTECTING
THE PHOTORESPONSIVE TRANSDUCER IN
A PINHOLE DETECTOR
Garrett B. Linderman, Washington, D.C., and Harry T.
Gibson, Silver Spring, Md., assignors to Linderman
Engineering Company, Inc., a corporation of Maryland
Filed Mar. 23, 1965, Ser. No. 442,098
4 Claims. (Cl. 250—219)

ABSTRACT OF THE DISCLOSURE

This application relates to a pinhole detector in which a light source and sensitive photoresponsive transducer are positioned on opposite sides of a sheet material undergoing inspection. The disclosure teaches a method of protecting the sensitive transducer from excessive light as when the strip of material undergoing inspection fails to occupy a position between the light source and transducer. Photosensitive means, in addition to the photosensitive transducers, are so positioned as to sense the absence of sheet material between the light source and transducer and to actuate a shutter moving device to shield the transducer from the light source at such time.

---

This invention relates to pinhole detectors and particularly to the protection of such photosensitive transducers as photomultiplier tubes employed to detect the presence of pinholes in the material undergoing inspection, such as tin plate.

In order to assure the detection of pinholes of the order of size that frequently occur in tin plate, it is necessary that extremely sensitive photoresponsive transducers be employed. When such highly sensitive devices, usually assuming the form of photomultiplier tubes, are employed, their exposure to light of high intensity for any protracted period seriously impairs their sensitivity for the detection of the small amounts of light for which they are primarily intended, and their useful life is greatly shortened. The impairment assumes the form of degradation of the signal-to-noise ratio of their output signals, resulting in the need for frequent replacement.

The most frequent exposure of photomultiplier tubes to excessive light in installations of the types under consideration, occurs when a strip of the material undergoing inspection fails to occupy a position between the light source and the photomultiplier tube or tubes to be protected.

It has been found, that by anticipating the arrival of the end of such a strip at a point in advance of the light source, one or more shutters can be interposed between the light source and the photomultiplier tube or tubes automatically, and thereby greatly extend the sensitivity and useful life of each such photomultiplier tube.

It is accordingly among the objects of the present invention to provide in combination with a pinhole detector providing a path for material to be inspected, a light source disposed on one side of the path, a photomultiplier tube on the other side of the path, light conducting means intermediate the path and tube, a shutter between the light conducting means and tube, means for selectively moving the shutter between light passing and light intercepting positions, and photosensitive means responsive to the presence and absence of material in the path causing the shutter to occupy the light passing and light intercepting positions respectively. The shutter moving means preferably includes electromagnetic means in circuit with the photosensitive means. The electromagnetic means is preferably normally energized to maintain the shutter in its light passing position when material to be inspected occupies the path so as to shield the photosensitive means from incident light.

An important application of the present invention occurs in conjunction with pinhole detectors having light sources producing large proportions of ultraviolet light in conjunction with photomultiplier tubes responsive to such ultraviolet light. The photosensitive means for sensing the end of a strip in anticipation of shutter actuation will preferably be disposed upstream of the path with respect to the light source. A manually operated switch in circuit with the shutter moving device to effect movement of the shutter to the light obscuring position may be incorporated in the system constituting the present invention to enable an operator to effect movement of the shutter independently of the photosensitive means.

The photosensitive means preferably includes a plurality of photoelectric devices spaced transversely of the path of movement of the material undergoing inspection and connected in circuit with the shutter moving device. Such photoelectric devices preferably have their outputs connected to a coincidence detecting device so that shutter actuation will occur only when both of the photoelectric devices are exposed to light at the same time. This provision will prevent actuation of the shutter in the event that a pinhole in the strip should register with one of the photoelectric devices. Accordingly, the shutter moving device will be insensitive to energization of only one of the photoelectric devices, in accordance with one embodiment of this invention. The light conducting means may be tubular and reflective or solid, depending on the nature of the light source. For ordinary light such as that produced by incandescent lamps, conductive solids, such as rods may be used. For ultraviolet light, internally reflective tubes are preferred.

It is also among the objects of the invention to provide in combination with a pinhole detector establishing a path for material to be inspected, a light source disposed on one side of the path, a plurality of photomultiplier tubes on the other side of the path, shutter means movably mounted adjacent the photomultiplier tubes, means for selectively moving the shutter means between light passing and intercepting positions with respect to the light source and photomultiplier tubes, and photosensitive means responsive to the presence of material in the path causing the shutter means to occupy the passing and intercepting positions respectively. The shutter means preferably includes a plurality of shutters, and preferably a shutter for each photomultiplier tube, together with means interconnecting the shutters for simultaneously actuating them.

A more complete understanding of the invention will follow from a description of the accompanying drawings wherein:

FIG. 1 is a somewhat diagrammatic view, partially in perspective and partially in block form illustrating a form of the invention;

FIG. 2 is a circuit diagram depicting in somewhat more detail the circuit components depicted in FIG. 1;

FIG. 3 is a somewhat diagrammatic view partially in elevation and partially in block form, depicting the invention as applied to a pinhole detector employing a plurality of photomultiplier tubes;

FIG. 4 is a fragmentary plan view, on an enlarged scale, along line 4—4 of FIG. 3; and FIG. 5 is a sectional elevation along line 5—5 of FIG. 4.

A strip of tin plate 10 or other material undergoing inspection as depicted in FIG. 1 travels along a path in the direction depicted by the arrow 12 and ordinarily intercepts light produced by a source located in a housing 14. The light source may produce ordinary visible light or predominantly ultraviolet light, in accordance with previously known practices. When such light is completely intercepted, none will pass through the window 16 of a scanner box to light conducting means 18 whose remote end or ends 20 present any collected light to a photomultiplier tube 22, serving, as will be well known to those skilled in the art, to indicate the presence of a pinhole in the strip as by marking the strip, classifying a sheet, or recording the location of the hole.

As depicted in FIG. 1, a shutter 24 carried by an arm 26 is interposed between the light conducting means 18 and the photomultiplier tube 22 to intercept light ahead of the light conducting means so that it will not be directed on the photomultiplier tube 22. This corresponds with a condition when there is no strip undergoing inspection in the path, or when the end of a strip is about to expose the light conductive means to the light source. The arm 26 carrying the shutter 24 is mounted for oscillation about a shaft 28 and is actuated by a solenoid 30 whose armature 32 is connected to the arm by means of a pivot pin 34.

A pair of photoelectric devices 36 are disposed below the path of the strip 10 in transversely spaced relationship and somewhat upstream from or ahead of the light source contained within the housing 14. Accordingly, these photoelectric devices 36 are ordinarily shielded by the strip of material undergoing inspection from ambient light. However, when the end of such a strip uncovers these photoelectric devices, they will be exposed to ambient light and their resulting outputs will be supplied to an amplifier 38 whose output is connected to a rectifier 40 which is in turn connected to supply a Schmitt trigger 42 having an output connected to a relay 44 in circuit with the solenoid 30 and a suitable voltage source 45. The solenoid 30 is shown in FIGS. 1 and 2 in its deenergized position, corresponding to the absence of a strip from the path, and consequently, the shutter 24 assumes a light intercepting position. Whenever a strip to be inspected occupies the path and covers the photoelectric devices 36, the relay 44 will be actuated to energize the solenoid 30 and shift the shutter 24 to its light passing position, again permitting light from the source within the housing 14 to pass through any pinholes occurring in the strip and energize the photomultiplier tube 22. A monitor lamp 46 is connected in the output circuit of the relay 44 to provide a visual indication to an operator that the solenoid is energized and therefore the shutter occupies its light passing position. A manually actuated pushbutton 48 is suitably connected between the Schmitt trigger and the relay 44 to enable an operator to effect interposition of the shutter 24 between the light source and the photomultiplier tube.

The invention is depicted in FIGS. 3, 4 and 5 as applied to a pinhole detector utilizing a pluarlity of photomultiplier tubes 22, in conjunction with reflectors 50, for sensing any light directed from the source in the housing 14 through pinholes occurring in the strip undergoing inspection and traversing the path 10. In this case, each of the photomultiplier tubes 22 is partially covered by an opaque shield 52, containing a gap 54 through which light from the source penetrating a pinhole will pass to the tube 22. A shutter 56 surrounds each shield 52 and is mounted on a pivot 58 for partial rotation from the light passing position illustrated, to a light intercepting position, when the solenoid 30 is deenergized. Each shutter 56 is provided with an arm 60 containing a slot 62, for reception of a pin 64 secured to a rod 66, coupled to the armature 68, by a pin 70, for simultaneous operation of the shutters under the influence of the solenoid 30 in response to the incidence of light on the photocells 36 or to operation of the manual switch 48.

It is contemplated that the exposure of the photomultiplier tubes to such excessive amounts of light as would be apt to damage them be sensed in a variety of ways, including proximity sensing of material undergoing inspection, use of standing waves, sensing excessive signals by the tubes themselves, and other procedures which the present invention will suggest to those skilled in the art.

Accordingly, such variations of the arrangements described as will suggest themselves to those skilled in the art are contemplated as coming within the scope of the appended claims.

We claim:

1. In combination with a pinhole detector providing a path for material to be inspected, a light source disposed on one side of said path, a photomultiplier tube on the other side of said path, light conducting means intermediate said path and tube, a shutter between said light conducting means and tube, means for selectively moving said shutter between light passing and intercepting positions, photosensitive means including a plurality of photoelectric devices spaced transversely of said path and connected in circuit with said shutter moving device, said photoelectric devices having their outputs connected to a coincidence detecting device and being responsive to the presence and absence of material in said path causing said shutter to occupy said passing and intercepting positions respectively.

2. In combination with a pinhole detector providing a path for material to be inspected according to claim 1 wherein said shutter moving device is insensitive to energization of only one of said photoelectric devices.

3. In combination with a pinhole detector providing a path for material to be inspected according to claim 1 wherein said shutter moving means includes electromagnetic means in circuit with said photosensitive means.

4. In combination with a pinhole detector providing a path for material to be inspected, a light source disposed on one side of said path, a plurality of photomultiplier tubes on the other side of said path, an individual shutter movably mounted adjacent each of said photomultiplier tubes, photosensitive means responsive to the presence and absence of material in said path for selectively moving said shutter means between light passing and intercepting positions with respect to said light source and photomultiplier tubes respectively, means interconnecting said individual shutters with said shutter moving means for simultaneous actuation of said shutters.

References Cited

UNITED STATES PATENTS

| | | | |
|---|---|---|---|
| 2,892,951 | 6/1959 | Linderman | 88—14 X |
| 2,958,785 | 11/1960 | Camp | 250—219 |
| 2,976,758 | 3/1961 | Parker | 250—203 X |
| 3,165,961 | 1/1965 | Hammond | 250—219 X |
| 3,177,367 | 4/1965 | Brown | 250—215 X |
| 3,188,478 | 6/1965 | Binks | 250—219 |
| 3,198,883 | 8/1965 | Borberg | 250—215 X |

WALTER STOLWEIN, *Primary Examiner.*